United States Patent
De Hoogh et al.

(10) Patent No.: US 11,070,358 B2
(45) Date of Patent: Jul. 20, 2021

(54) COMPUTATION DEVICE AND METHOD

(71) Applicant: KONINKLIJKE PHILIPS N.V., Eindhoven (NL)

(72) Inventors: Sebastiaan Jacobus Antonius De Hoogh, Oosterhout (NL); Ronald Rietman, Eindhoven (NL); Ludovicus Marinus Gerardus Maria Tolhuizen, Waalre (NL); Hendrik Dirk Lodewijk Hollmann, Valkenswaard (NL)

(73) Assignee: Koninklijke Philips N.V., Eindhoven (NL)

( * ) Notice: Subject to any disclaimer, the term of this patent is extended or adjusted under 35 U.S.C. 154(b) by 558 days.

(21) Appl. No.: 16/061,541

(22) PCT Filed: Dec. 14, 2016

(86) PCT No.: PCT/EP2016/081062
§ 371 (c)(1),
(2) Date: Jun. 12, 2018

(87) PCT Pub. No.: WO2017/102879
PCT Pub. Date: Jun. 22, 2017

(65) Prior Publication Data
US 2020/0266973 A1    Aug. 20, 2020

(30) Foreign Application Priority Data
Dec. 15, 2015    (EP) ..................... 15200035

(51) Int. Cl.
*H04L 9/06* (2006.01)
*H04L 9/00* (2006.01)

(52) U.S. Cl.
CPC ............ *H04L 9/0625* (2013.01); *H04L 9/002* (2013.01); *H04L 2209/16* (2013.01); *H04L 2209/34* (2013.01)

(58) Field of Classification Search
CPC ........ H04L 2209/16; H04L 9/002; H04L 9/06
See application file for complete search history.

(56) References Cited

U.S. PATENT DOCUMENTS

| 5,442,306 A | 8/1995 | Woo |
| 7,043,016 B2 | 5/2006 | Roelse |

(Continued)

FOREIGN PATENT DOCUMENTS

| WO | 2014095772 A1 | 6/2004 |
| WO | 2015082212 A1 | 6/2015 |
| WO | 2017063986 A1 | 4/2017 |

OTHER PUBLICATIONS

Stanley Chow et al., A White-Box DES Implementation for DRM Applications, 2003, Springer-Verlag Berlin Heidelberg, pp. 1-15 (Year: 2003).*

(Continued)

*Primary Examiner* — Ellen Tran

(57) ABSTRACT

A computation device (200) arranged to evaluate a data function (S) mapping a number (n) of input variables to a number of output variables (m). The computation device comprises selection mechanism (220) receiving as input selection variables and an evaluation mechanism (210) arranged to receive the one or more evaluation variables and to evaluate the evaluation functions for the received evaluation variables, an evaluation function receiving as input the evaluation variables.

20 Claims, 8 Drawing Sheets

(56) References Cited

U.S. PATENT DOCUMENTS

| | | | |
|---|---|---|---|
| 7,697,684 | B2 | 4/2010 | Matsui et al. |
| 8,091,139 | B2 | 1/2012 | Klimov |
| 2001/0019610 | A1 | 9/2001 | Shimoyama |
| 2004/0139340 | A1 | 7/2004 | Johnson et al. |
| 2005/0283714 | A1 | 12/2005 | Korkishko et al. |
| 2006/0140401 | A1* | 6/2006 | Johnson ............ H04L 9/0625 380/44 |
| 2008/0285744 | A1 | 11/2008 | Gorissen et al. |
| 2015/0312039 | A1* | 10/2015 | Michiels ............ H04L 9/3231 713/186 |

OTHER PUBLICATIONS

Sebastien Josse, White-box attack context cryptovirology, Springer-Verlag France, 2008, pp. 1-14 (Year: 2008).*

Francois-Xavier Standaert et al., Masking with Randomized Look up Tables Towards Preventing Side-Channel Attacks of All Orders, 2012, Springer-Verlag Berlin, pp. 1-17 (Year: 2012).*

Yoni De Mulder, White-Box Cryptography Analysis of White-Box AES Implementations, Ku Leuven Arenberg Doctoral School,—Belgium, 2014, pp. 1-244 (Year: 2014).*

Yang Shi et al., A Lightweight White-Box Symmetric Encryption Algorithm against Node Capture for WSNs, School of Software Engineering—Tongi Univerisity, Shanghai China, pp. 1-25, May 21, 2015 (Year: 2015).*

Carlet et al: "Higher-Order Masking Schemes for S-Boxes"; FSE 2012, LNCS 7549, pp. 366-384, 2012.

Carlet et al: "Algebraic Decomposition for Probing Security"; Crypto 2015, Part 1, LNCS 9215, pp. 742-763.

Chow et al: "White-Box Cryptography and an AES Implementation"; SAC 2002, LNCS 2595, pp. 250-270, 2003.

Coron et al: "Fast Evaluation of Polynomials Over Binary Finite Fields and Application to Side-Channel Countermeasures"; CHES 2014, LNCS 8731, pp. 170-187, 2014.

Ishai et al: "Private Circuits: Securing Hardware Against Probing Attacks"; Crypto 2003, Downloaded From www.iacr.org/archive/crypto2003/27290462/27290462.pdf. pp. 462-479, 2003.

* cited by examiner

COMPUTATION DEVICE AND METHOD

CROSS-REFERENCE TO PRIOR APPLICATIONS

This application is the U.S. National Phase application under 35 U.S.C. § 371 of International Application No. PCT/EP2016/081062 filed on Dec. 14, 2016, which claims the benefit of o. or European Patent Application No. 15200035.2, filed on Dec. 15, 2015. These applications are hereby incorporated by reference herein.

FIELD OF THE INVENTION

The invention relates to a computation device, a computation method, a computer program, and a computer readable medium

BACKGROUND

In the white box model, a hacker may be able to take full control over the software that runs on a computing device, e.g., a smartphone or a PC. It is the goal of white box cryptography to protect the software implementation against such a hacker.

When a cryptographic scheme involving keys is to be protected in the white box model, then this usually implies that an attacker who has access and full control of the secure software and its execution environment should not be able to extract any sensible information about the keys.

One way to avoid an attacker gaining access to keys in the information is to implement part of or all of a sensitive algorithm as a table network. The tables operate on encoded variables. It will be difficult for an attacker to determine what operation a table performs as he has no knowledge of the encoding. Replacing operations by table accesses usually increases the code size. Moreover, some countermeasures to further protect the tables have the effect of further increasing the code size.

For example, one possible attack to obtain information on the keys when an attacker has access to the running implementation is a so-called collision attack, where the attacker measures a key dependent variable in different runs on different inputs. The attacker collects statistics on the collisions, i.e., variables taking the same value in different runs on different messages. Ultimately, an attacker may be able to collect sufficient information to extract the key. Mutual Information Analysis (MIA) is an example of such an attack.

To protect against the collision attack one may represent a variable w by n shares $\{w_i\}_i$ so that a collision on w can be detected only from collisions on the complete set $\{w_i\}_i$. As the latter will have a lower probability, collision attacks are made harder. Computing on shares has the effect that the table size is again significantly increased.

SUMMARY OF THE INVENTION

A computation device is provided arranged to evaluate a data function mapping a number of input variables to a number of output variables. The data function is arranged in the computation device as a computation comprising selection functions and evaluation functions. The input variables are partitioned into one or more selection variables and one or more evaluation variables. For each particular combination of values of the selection variables a corresponding selection function and evaluation function is defined.

The computation device comprises
a selection mechanism arranged to receive the one or more selection variables, and to evaluate the selection functions for the received selection variables; a selection function receiving as input the selection variables, and the output of the selection function indicating whether the selection variables received in the selection function are equal to the particular combination of values corresponding to the selection function,
an evaluation mechanism arranged to receive the one or more evaluation variables and to evaluate the evaluation functions for the received evaluation variables, an evaluation function receiving as input the evaluation variables and the output of the evaluation function representing the output of the data function having as input the union of the evaluation variables and the particular combination of values of the selection variables corresponding to the evaluation function, and
a combination mechanism arranged to combine the outputs of the selection mechanism and the evaluation mechanism into the output of the data function for the input variables.

Both the evaluation and the selection functions receive as input fewer inputs than the data function. As a result the code size for implementation of the evaluation and selection functions is reduced. This is especially relevant in a white box implementation in which the evaluation and/or selection functions are implemented as tables or table networks because this requires smaller tables. Although the circuit size may increase as a result of the partition in evaluation and selection variables the code size is reduced. Moreover, the selection functions are particularly simple functions that are easy to implement in a polynomial based implementation, such as may be used when the variables are represented as multiple encoded shares. Because the selection functions are the same for different data functions, they may be reused for multiple data functions; this further reduces code size.

In an embodiment, the selection variables are further partitioned into multiple groups of selection variables, a selection function being arranged in the computation device as a product of multiple sub-selection function each one corresponding to a group of the multiple groups of selection variables, a sub-selection function receiving as input the selection variables in the group and the output of the sub-selection function indicating whether the received selection variables equal the particular combination of values in the group corresponding to the selection function.

A further subdivision of the selection variables further decreases the code size for implementing the selection mechanism.

The selection mechanism causes the right evaluation function to be selected based on the selection variables. The evaluation mechanism evaluates the outcome of the data function for different possible values of the selection variables and the evaluation variables. An evaluation function only requires the evaluation variables as input. The evaluation variables are supplemented in the evaluation function by the particular combination of selection variable values that correspond to the evaluation function. Although this will increase the number of evaluation functions, it will decrease the size of such functions.

The selection mechanism may be implemented as a selection system; for example in the form of a circuit and/or appropriate software running on a processor. The evaluation mechanism may be implemented as an evaluation system; for example in the form of a circuit and/or appropriate software running on a processor For example, said software may comprise multiple table look-up operations in a table network.

In an embodiment, one or more of the input variables are encoded. In fact all of the selection and evaluation variables may be encoded. Operating on encoded variables may be done by tables that are encoded for the same encoding.

An important way of encoding variables, in particular the selection and evaluation variables, is to encode the variables as a plurality of encoded shares. Operations may be executed on variables encoded in this manner, by representing the operation as a polynomial in a finite field. The polynomial may be evaluated using tables that represent operations like addition and multiplication. An advantage of this type of encoding is that the tables for addition and multiplication may be re-used throughout the polynomial evaluation. This further reduces code size.

The computation device is an electronic device, for example, a mobile electronic device, e.g., a mobile phone. The computation device may be a set-top box, a smart card, a computer, and the like.

The method of computation described herein may be applied in a wide range of practical applications. Such practical applications include cryptographic applications. For example, signing, decrypting and encryption, etc., information may be done in software without revealing the key used to perform the cryptographic operation. For example, the computation device may be used for sensitive applications, say using a proprietary algorithm. The difficulty for an attacker of reverse engineering the software is increased.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of a data function, FIG. 2a schematically shows an example of an embodiment of a computation device, FIG. 2b schematically shows an example of an embodiment of an evaluation mechanism, FIG. 2c schematically shows an example of an embodiment of a selection mechanism, FIG. 2d schematically shows an example of an embodiment of a selection mechanism, FIG. 2e schematically shows an example of an embodiment of a computation device, FIG. 3 schematically illustrates an example of encoding a variable, FIG. 4a schematically shows an example of an embodiment of a table network, FIG. 4b schematically shows an example of an embodiment of a table network, FIG. 5a schematically shows a flow chart for a computation method, FIG. 5b schematically shows a flow chart for a computation method, FIG. 6a schematically shows an example of an embodiment of the DES block cipher, FIG. 6b schematically shows an example of an embodiment of the DES round function, FIG. 7a schematically shows a computer readable medium having a writable part comprising a computer program according to an embodiment, FIG. 7b schematically shows a representation of a processor system according to an embodiment.

DETAILED DESCRIPTION OF PREFERRED EMBODIMENTS

Figure 1:
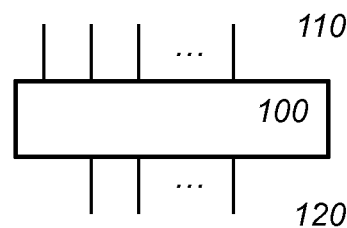

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described above or recited in mutually different dependent claims.

Figure 6A:
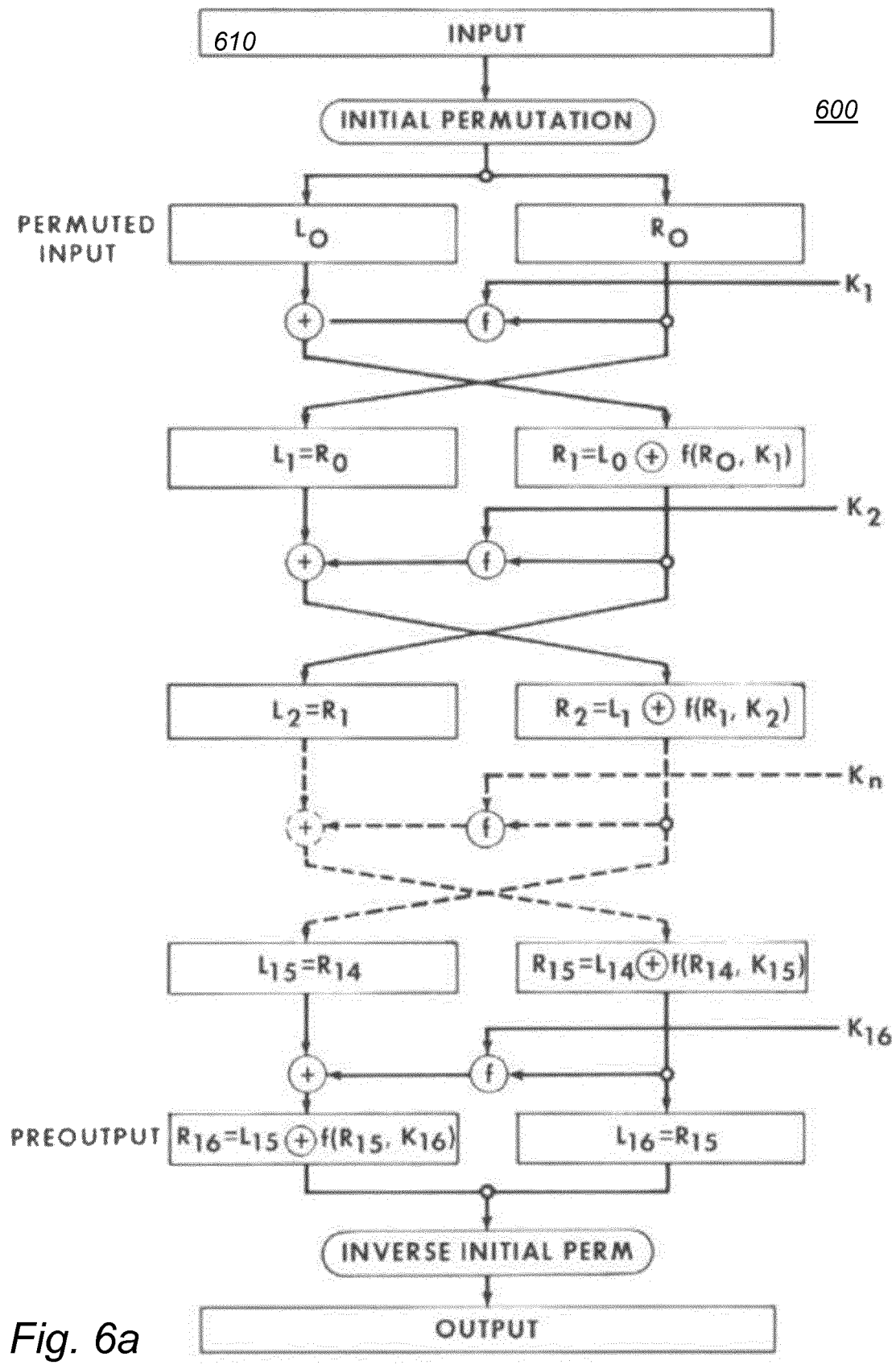

FIG. 6a, which is copied from FIPS 46-3 illustrates the DES block cipher in particular and block ciphers in general. The block cipher receives a block cipher input 610 on which a sequence of block cipher rounds acts; in the case of DES there are 16 rounds, for triple DES 48. The first block cipher round acts on the block cipher input 610, each one of the next rounds acts on the output of the previous rounds. In a block cipher round a round function $f$ is applied to part of the previous round's output. The block cipher input has a data size, in case of DES of 64 bits. Each block cipher round modifies its block cipher round input to produce a block cipher round output. All block cipher round input and output have the same data size. Note that DES has an initial permutation and inverse initial permutation at the start and end of the block cipher. These have no cryptographic significance, since they do not depend on a key.

The Data Encryption Standard describes a keyed block encoding of a 64-bit block. The key is officially 64 bits, but only 56 bits thereof are actually used in the encryption. Encryption and decryption uses 16 iterations, called rounds.

In round r, $1 \leq r \leq 16$ a 48-bit round key $K_r$ is used, the bits of which are a (round-dependent) subset of the 56 key bits.

Figure 6B:
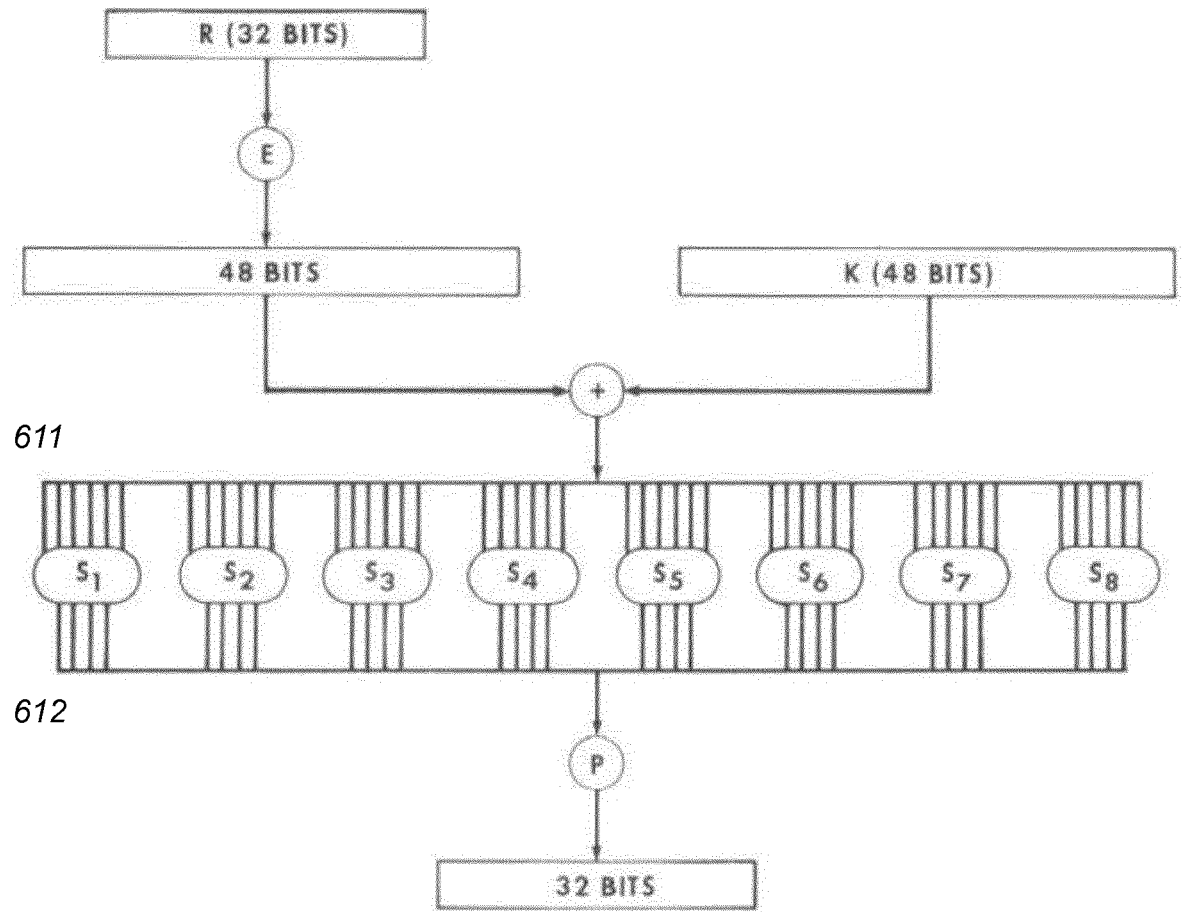

The DES round function $f$ is illustrated in FIG. 6b and is given by:

$$f(R,K)=P(S(K \oplus E(R))).$$

Here P is a permutation of 32 bits, and E an expansion map, which maps bit strings of length 32 into bit strings of length 48 by duplicating half the bits. S-box S maps bit strings of length 48 into bit strings of length 32, acting group-wise on 6-bit substrings:

$$S(b_1b_2b_3\cdots b_{48})=S_1(b_1\cdots b_6)\|S_2(b_7\cdots b_{12})\|\cdots\|S_8(b_{43}\cdots b_{48}),$$

where each S-box $S_i$ maps bit strings of length 6 onto bit strings of length 4 and $\|$ denotes concatenation. In FIG. 6b the input of s-box $s_1$ has reference 611, the output has reference 612.

S-boxes (substitutions boxes) are commonly used in block ciphers to increase the Shannon confusion of the block cipher. An s-box is particularly suitable to be encoded as the data function according to an embodiment. Decryption is performed by going backwards, i.e., from bottom to top. The inverse round function is given by $$R_{r-1}=L_r, L_{r-1}=R_r \oplus f(L_r, K_r).$$

As DES uses a key of only 56 bits, so that a full key space search is feasible; however, key recovery using a differential fault attack especially on a software implementation will be orders of magnitude faster. Triple-DES uses three 56-bit keys ($K^{(1)}$, $K^{(2)}$, $K^{(3)}$) and encrypts by first performing a DES encryption with key $K^{(1)}$, followed by a DES decryption with key $K^{(2)}$, followed by a DES encryption with key $K^{(3)}$, DES will be used herein as the principal example of a block cipher, and the DES S-boxes as the main example of data function. Indeed embodiments based on DES have been tested extensively and it was found that white box encodings of DES are considerably smaller in an embodiment, as further specified below. Results on DES immediately transfer to triple DES, as the S-boxes are the same as in DES. Other embodiments apply to other block ciphers, e.g., to AES, and in particular to its s-box(es). AES is not of Feistel-type like DES, but is a substitution-permutation network (SPN) block cipher. The S-box DES has more inputs than outputs (6 versus 4) whereas the S-box of AES has an equal number of inputs and outputs.

In general, embodiments of the system explained below may also be used for other functions, e.g., that require a secure implementation. For example, security primitives such as hashes or message authentications codes, etc, may be implemented using an embodiment.

FIG. 1 schematically shows an example of a data function 100. Data function s maps a number (n) of input variables 110 to a number (m) of output variables 120. For example, the data function may be an S-box, like the S-box of DES. The inputs of data function 100 may be bits, for example in the case of a DES S-box there maybe 6 inputs bits, and 4 output bits. In the case of an AES S-box, there may 8 input and output bits. The number of bits may be different for example, 8 input bits and 4 output bits, etc.

Below we will represent the data function 100 as a function of the form $F_{2^n} \to F_{2^m}$. That is from the mathematical field with $2^n$ elements to the field with $2^m$ elements. One may have n=m, say as in an AES S-box. Embodiments in which m<n are particularly advantageous since they allow all computations to be performed in the smaller field $F_{2^m}$; we will refer to functions with m<n as 'funnel' functions, since the range is strictly smaller than the domain. If not bits are used but say variables that take more than 2 different values, a correspondingly larger field may be used to perform computations in.

Figure 2A:
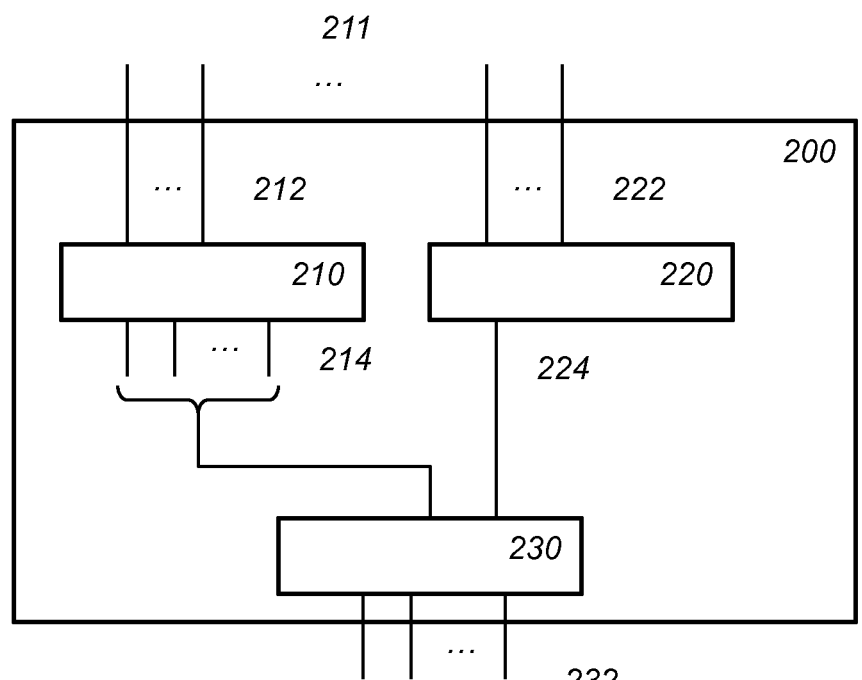

FIG. 2a schematically shows an example of an embodiment of a computation device 200. Implementing the data function of FIG. 1 may require a lot of storage, especially if encoding of the input and/or outputs are used. For example, in a white-box implementation, the data function of FIG. 1 may be implemented as a monolithic table. However, even for the case of a DES S-box the amount of data in such a table may quickly increase. For example, if each bit is encoded as 16 shares, and each share additionally has a state bit, totaling 16 state bits (see below for more information on possible encodings), the input size of the S-box balloons to $32 \times 6=192$ bits. This means that the monolithic table would be impossibly large, having $2^{192}$ entries. There is thus a desire for a different way to encode a data function which can be encoded in white box in a secure manner yet requires less storage space.

Computation device 200 is arranged to receive inputs 211. Inputs 211 may be like the inputs of data function 100. The inputs may be encoded. Inputs 211 may be multiple bits. Inputs 211 may also be taken from some other field, say $F_4$ (the field with 4 elements) instead of bits. The inputs variables are partitioned into one or more selection variables and one or more evaluation variables. In principle any partition is possible, but different choices will have different tradeoff. Generally speaking, increasing the number of selection bits will lead to a smaller implementation size, whereas choosing fewer selection bits will lead to a faster implementation. Implementation size refers to the storage size of the implementation, in particular to the total table size used in a white box implementation. Large tables will in turn lead to cache misses and thus also to slower execution.

Data function 100 is arranged in computation device 200 as a computation comprising selection functions and evaluation functions. For each particular combination of values of the selection variables ($\upsilon$) a corresponding selection function $\delta_\upsilon$ and evaluation function $s_\upsilon$ is defined. To avoid confusion, we note that evaluation function $s_\upsilon$ need not necessarily be related to any one of the DES S-boxes; moreover, the index v refers here to selection variables.

Computation device 200 comprises a selection mechanism 220. Selection mechanism 220 is arranged to receive the one or more selection variables 222. The input variables of input variables 211 which are selection variables are indicated at 222. Selection mechanism 222 is arranged to evaluate the selection functions $\delta_\upsilon$ for the received selection variables. For example, selection mechanism 220 may evaluate each selection functions $\delta_\upsilon$ for each particular combination of values of the selection variables ($\upsilon$) for the selection variables. A selection function $\delta_\upsilon$ receives as input the selection variables, and the output of the selection function indicates whether the selection variables received in the selection function equal the particular combination of values ($\upsilon$) corresponding to the selection function. The output of the selection mechanism is indicated at 224.

A selection function may be a Kronecker's Delta functions, except that they may have multiple inputs. In mathematical notation $\delta_i(j)$ denotes:

$$\delta_i(j) = \begin{cases} 1 & \text{if } i=j, \\ 0 & \text{otherwise.} \end{cases}$$

In the above example i and j may stand for multiple inputs, e.g., for all selection variables. Furthermore, a selection function does not necessarily have to return the outputs 0 and 1, although these are convenient, but may use other values, in principle any two different values may used, and accommodated elsewhere in computation device 200. Computation device 200 comprises an evaluation mechanism 210. Evaluation mechanism 210 is arranged to receive the one or more evaluation variables 212 and to evaluate the evaluation functions for the received evaluation variables. The input variables of input variables 211 which are evaluation variables are indicated at 212.

An evaluation function receives as input the evaluation variables and the output of the evaluation function represents the output of the data function having as input the union of the evaluation variables and the particular combination of values of the selection variables corresponding to the evaluation function. In other words, the evaluation function gives the result the data function would have given if the data function had received the evaluation variables as input together with the particular values of the selection variables to which the evaluation function correspond.

An idea in embodiments is that the selection functions select which particular combination of values of the selection variables is present at the input, and in a sense select the correct evaluation function. Selection functions are particularly easy functions to implement. Selection functions depend only on the number of selection bits, and may be the same for different data functions. Accordingly, a selection function may be re-used for different data function in the same computation device.

The evaluation mechanism and selection mechanism may also be referred to as an evaluation unit and selection unit.

Computation device 200 comprises a combination mechanism arranged to combine the outputs of the selection mechanism and the evaluation mechanism into the output of the data function for the input variables. For example, the combination mechanism may sum products ($\Sigma_\upsilon \delta_\upsilon S_\upsilon$) of a selection function ($\delta_\upsilon$) and an evaluation function ($S_\upsilon$) corresponding to the same particular combination of values. In case the selection function gives the values 0 and 1, this will precisely identify the correct evaluation functions. In case the selection function gives some other values than 0 and 1, some other linear combination of the selection functions may be used.

In an embodiment, the sum is over all combinations of values of the selection variables ($\upsilon$). In this way the data function will be correctly emulated for all input variables. However, if it is known that some combination of selection variables cannot occur, then the sum needs only to be taken over the possible combinations of selection variables. This will further reduce the size of the computation device.

Below a mathematical description of an embodiment is given for further clarification and exemplification.

The data function considered is the function S: $F_{2^n} \to F_{2^m}$; note we may have that m<n. We choose positions $i_1, \ldots, i_{n-m}$, as the selection variables from the set of input positions (or variables) $\{1, \ldots, n\}$; let the m remaining positions be $p_1, \ldots, p_m$ contain the evaluation variables. Now for each $v = v_1 \cdots v_{n-m} \in F_{2^{n-m}}$, we define the function $S_v: F_{2^n} \to F_{2^m}$ by letting $S_v(x_1 \cdots x_m) = S(y_1 \cdots y_n)$, where $y_{i_j} = v_j$ for j=1, ..., n−m and $y_{p_j} = x_j$ for j=1, ..., m. In other words, for each $v \in F_{2^{n-m}}$, the function $S_v$ is obtained from S by setting a selection of n−m of the inputs to the values specified by v. In order to compute S(x), we consider the values of the input x in the n−m selected positions; if that value is v, then we apply the function $S_v$ on the remaining input symbols.

In a secure, say white box, evaluation of S(x) the selection mechanism selects $$S_v = S_{x_{i_1}, \ldots, x_{i_{n-m}}}$$

and then returns the result $S_v(x_{p_1}, \ldots, x_{p_m})$, without revealing information about both input x and output S(x). The combination mechanism 230 may use the following identity:

$$S(x) = S_{x_{i_1}, \ldots, x_{i_{n-m}}}(x_{p_1}, \ldots, x_{p_m}) = \sum_{v=1}^{2^{n-m}} \delta_v(x_{i_1}, \ldots, x_{i_{n-m}}) \cdot S_v(x_{p_1}, \ldots, x_{p_m}),$$

where $\delta_i(j)$ satisfies $$\delta_i(j) = \begin{cases} 1 & \text{if } i = j, \\ 0 & \text{otherwise.} \end{cases}$$

Figure 2B:
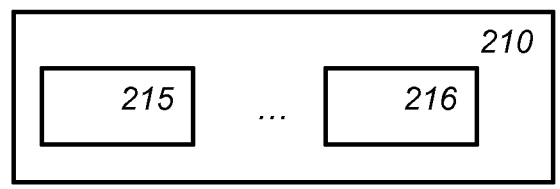

FIG. 2b schematically shows an example of an embodiment of an evaluation mechanism 210. Evaluation mechanism 210 may comprises multiple evaluation units implementing the evaluation functions; shown are evaluation units 215 and 216. An evaluation unit may be implemented as a table, e.g., a look-up table, or as a table-network. For example, the evaluation mechanism of FIG. 2b may evaluate each one of the evaluation functions, including functions 215 and 216 for the evaluation variables received in evaluation mechanism 210. The correct result is bound to be included within the evaluation functions, if evaluation functions are included for each possible combination of values of the selection functions. Selecting the right result from amongst the multiple results of the multiple evaluation functions is performed by a selection mechanism.

Figure 2C:
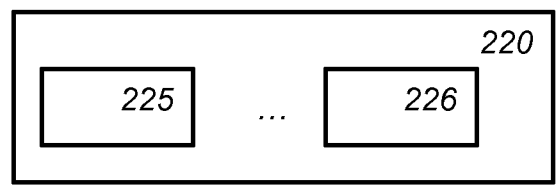

FIG. 2c schematically shows an example of an embodiment of a selection mechanism 220. Selection mechanism 220 may comprises multiple selection units implementing the selection functions; shown are selection units 225 and 226. A selection unit may be implemented as a table, e.g., a look-up table, or as a table-network.

Figure 2D:
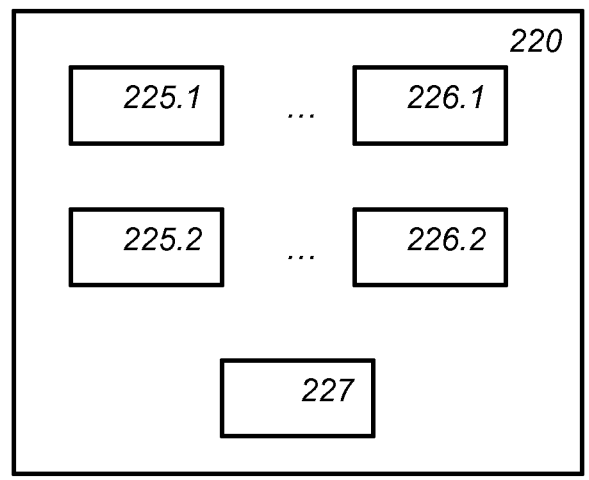

FIG. 2d schematically shows an example of an embodiment of a selection mechanism 220. In an embodiment, the selection variables may be further partitioned into multiple groups of selection variables. A selection function can then be arranged in computation device 200 as a product of multiple sub-selection function each one corresponding to a group of the multiple groups of selection variables, a sub-selection function receiving as input the selection variables in the group and the output of the sub-selection function indicating whether the received selection variables equal the particular combination of values in the group corresponding to the selection function.

For example, in selection mechanism 220 of FIG. 2d, the selection units 225.1, and 226.1 may receive a first group of selection variables, whereas selection units 225.2 and selection unit 226.2 may receive a second group of selection variables. There may be more groups than 2. If desired the number of selection variables may be padded with dummy variables, say with 0's, until the number of selection variables and dummy variables is a multiple of the number of group; in the latter case the number of inputs in a selection unit may be the same. A combination unit 227 is arranged to combine the outputs of the selection units corresponding to the same combination of values. For example, combination unit 227 may combine the outputs of combination units 225.1 and of 225.2, for example, by multiplication, or by a logical-and operation.

For example, in an embodiment the data function is a funnel function; with n input variables and m output variables (m<n). In the embodiment, the number of evaluation variables may be chosen as m, the number of selection variables as n−m. The number of groups of selection variables is chosen as $$\lceil \frac{n-m}{m} \rceil.$$

These choices allow all computations to be performed in $F_{2^m}$, the latter in turn allows more re-use of encoded multiplication and addition tables than if computations were needed in multiple different fields. For example, if n=8, and m=3, two groups of selection bits may used, having one padding bit.

Below a mathematical description of an embodiment is given for further clarification and exemplification. To ensure computation over the smaller output field $F_{2^m}$ only, we split the selection bits $(x_{i_1}, \ldots, x_{n-m})$ into chunks of m bits, say $$((z_1^1, \ldots, z_m^1), \ldots, (z_1^k, \ldots, z_m^k)) = (x_{i_1}, \ldots x_{i_{n-m}}),$$

where $k := \lceil n/m \rceil$ and each $z^i \in F_{2^m}$. If n−m does not divide m we pad the selection bits with leading zeros until the resulting number of bits does divide m before the splitting. If instead of bit q-valued variables are used, the $2^m$ above may be replaced by $q^m$.

From $(i_1, i_2) = (x_1, x_2)$ if and only if both $i_1 = x_1$ and $i_2 = x_2$ we have $$\delta_{(i_1,i_2)}((x_1,x_2)) = \delta_{i_1}(x_1) \cdot \delta_{i_2}(x_2).$$

The latter result may also be indicated as an addition a logical comparison: $((\delta_{i_1}(x_1) + \delta_{i_2}(x_2)) = 2)$. In this equation the '=' operation is interpreted as a logical operation like Kronecker delta, e.g., returning 0 in case of inequality and 1 in case of equality. A logical comparison may be performed on encoded variables using a table network as well. If more than 2 groups are used the '2' in the formula may be replaced by the number of groups.

In an embodiment, the selection mechanism 220 of FIG. 2d comprises a selection function for all combination of values for each of the multiple groups of selection variables. For example, if there are 8 selection variables, divided into two groups A and B of selection variables, selection mechanism 220 may comprise selection functions for all possible combination of values for group A and for selection functions for all possible combination of values for group B. To emulate a selection function for a particular combination of values for the full set of selection functions, combination unit 227 may be arranged to combine the correct selection function from group A and from group B. The selection functions on a group of variables may also output 0 and 1 to indicate the absence or presence of a match. These values can be easily combined with multiplication, or addition etc.

The selection mechanism may comprise multiple selection units implementing the selecting functions, for example, the multiple selection units may represent the selection functions directly, or may represent selection function on groups of selection variables.

The selection units and/or evaluation units may be implemented as tables or table networks.

In an embodiment, the number of input variables (n) is larger than the number of output variables (m), the number of evaluation variables being equal to the number of output variables. The number of selection variables may be equal to the difference (n−m) between the number of input variables and the number of output variables. This allows all computations to be done using the smaller number of variables, e.g., in the field $F_{2^m}$.

There exist several ways to encode a variable w. The variable w may directly correspond to a selection or evaluation variable. However, variable w may also collect several variables together. For example, computation device 200 may be arranged to operate on multiple variables together. For example, in an embodiment, the selection, evaluation, and output variables are bit-variables, representing a single bit. In an embodiment multiple bit-variables may be combined in larger variables.

For example, in an embodiment, variable 310 may represent 2 or 4 selection or evaluation variables. For example, for a funnel function, the larger variable may have the same number of bits as the output variables (m). The (n−m) selection variables are collected into one or more groups of (m) variables each of which is represented in a larger variable.

For example, a DES s-box has 4 output bit-variables, and 6 input bit-variables. In this case a larger variable w may represent 4 bits. The inputs bits may be partitioned into 4 evaluation bits, represented by a single larger 4-bit variable, and 2 selection variables, which also are represented by a single (larger) 4-bit variable.

For example, an AES s-box has 8 output bit-variables, and 8 input bit-variables. In this case a larger variable w may also represent 4 bits. The inputs bits may be partitioned into 4 evaluation bits, represented by a single larger 4-bit variable, and 4 selection variables, also represented by a single larger 4-bit variable. The output may be represented by two larger 4-bit variables. Below it is explained how a variable w whether a bit-variable or larger variable may be represented.

A variable w may be encoded through a mapping Enc(w). The encoding is a cryptographic encoding and may be chosen randomly, or may be an encryption using a secret key, etc. The used encoding is unknown to the attacker. When variable w is processed, the encoding is implicitly assumed in the device. A variable may also be encoded together with a state variable s, Enc(w,s) this further confuses the relationship between w and the encoding. A more secure encoding splits a variable into multiple shares and encodes each share, preferably together with a state variable. Although the latter type of encoding is the most secure, it is especially in this type of encoding that is hard to combine with a representation of a data function as a table network.

Figure 3:
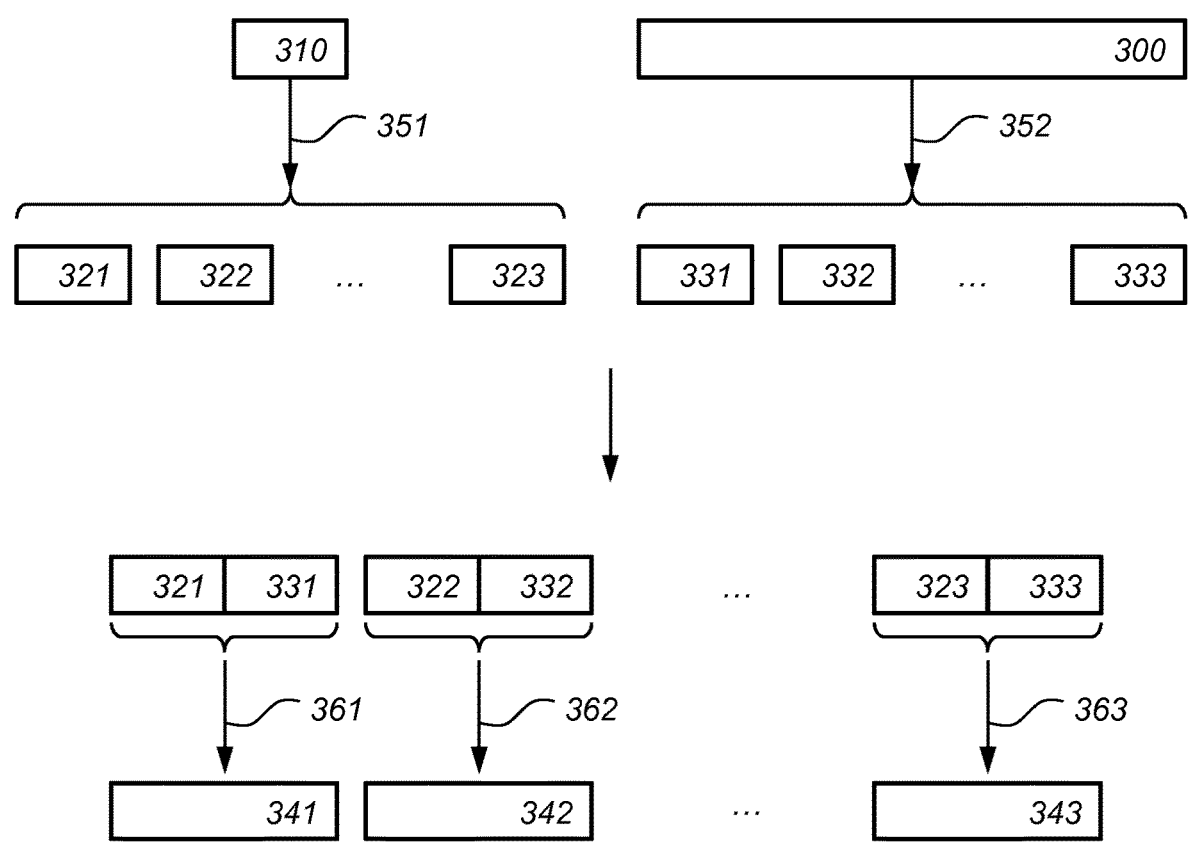

FIG. 3 illustrates a way to encode a variable w that uses multiple shares. FIG. 3 shows a variable 310, w and illustrates how w may be encoded for use in a cryptographic device such as cryptographic device 200 such that collisions on w are avoided. Variable 310, w is distributed over multiple shares $w^j$. We will refer to the bit size of w as k. In an embodiment, the bit size of the share $w^j$ equals the bit size of w. Different variables may have different bit sizes. For example, k may be 1, 2, 4 or more. In an embodiment, k=1, 2, 3 4, 5, 6, 7, 8, or more. Shown are shares 321, 322 and 323.

The shares may be chosen such that $w=\Sigma_{j=0}^{n-1}w^j$. In an embodiment, this sum uses the XOR function to sum, however other choices are possible. For example, the sum may use the arithmetical addition modulo $2^k$.

More generally, a combining function ($d(w^1, \ldots, w^{n-1})=w$) may be defined that maps the shares ($w^j$) to the variable (w). The combining function may be the XOR or arithmetic addition referred to above. The combining function has the property that that the mapping from any single share ($w^k$) to the variable (w), obtained by fixing the values of the other shares ($w^1, \ldots, w^{k-1}, w^{k+1}, \ldots, w^{n-1}$) is a bijection. That is, the function $d(\hat{w}^1, \ldots, \hat{w}^{k-1}, w^k, \hat{w}^{k+1}, \ldots, \hat{w}^{n-1})$ is a bijection; the elements $\hat{w}^j$ denoting a fixed value. This property ensures that no subset of shares gives information on w. Many such combining functions exist. For example, d may be any linear combination of the shares $w=\Sigma_{j=0}^{n-1}\alpha_j w^j$ in which the coefficients $\alpha_j$ are odd; the sum using arithmetical addition modulo $2^k$. The combining function may be polynomial.

FIG. 3 further shows multiple states $s^j$. Shown are states 331, 332 and 333. The number of shares 321-323 is the same as the number of states 331-333. States are redundant data which introduce redundancy into the encoding of a variable. Each one of the shares is arranged with one of the states and encoded into an encoded share: $x^j=Enc_j(w^j,s^j)$. In an embodiment, encodings $Enc_j$ are different. For example, the encodings $Enc_j$ may be chosen at compile time at random. It is not strictly necessary that an encoding is bijective, as long as it is invertible with respect to $w^j$, that is, with knowledge of $Enc_j$ and $x^j$ the share $w^j$ can be recovered. Nevertheless, in embodiments the encodings $Enc_j$ are bijective. The latter being a more practical choice in an implementation and simplifies analysis. Once it has been decided which variables will be encoded with which encodings at which point, the tables may be simply adapted to take the encoding into account. The use of states is optional, but is preferred as states increase obfuscation as they allow multiple representations for the same data value.

FIG. 3 shows that share 321 and state 331 are encoded though encoding 361 into an encoded share 341. Also share 322 and state 332 are encoded though encoding 362 into an encoded share 342; share 323 and state 333 are encoded though encoding 363 into an encoded share 343. We will refer to the states and shares which are encoded together to represent a variable w, as corresponding to that variable.

Multiple encoded shares are the result, of which are shown encoded shares 341, 342, and 343. In an embodiment, variable w is represented in cryptographic device 200 as multiple encoded shares. Neither the un-encoded shares 321-323 nor the states 331-333 should occur in the cryptographic device.

The states may simply be chosen initially at random and later updated through the same processes that update the variable w. In an embodiment, the multiple states $s^j$ corresponding to the same variable w are chosen such that there exists an injective mapping 352, denoted as $\Sigma$, from the input message M 310 to the multiple states ($\Sigma(M)=(s^0, \ldots, s^{n-1})$). An injective map has the property that $\Sigma(M)=\Sigma(M')$ if and only if M=M'. In particular, $\Sigma$ may be chosen to be bijective, as this more stringent condition implies injectivity. FIG. 3 shows how multiple states 331-333 depend on input message 300, M, and the injective map E, 352. For example, input message 300 may be input message 610. The input message 300 may for example, be an input message received from outside device 200, e.g., the input to a block cipher. As the states encode the input message M, 300, different M will lead to different encoded variables: $x^0, \ldots, x^{n-1}$.

The mapping 352 does not need to be explicit in the implementation of the cryptographic function for most or all variables. For example, once an encoded variable has the required injective relationship with the input message, operations performed on the share parts $w^j$ of an encoded variable may simultaneously perform redundant operations on the state parts that preserve the injective relationship. As the computations are done in the encoded domain the computations on the states cannot be separated from the computations on the shares.

For example consider that first and second variables $w_1$ and $w_2$ are both encoded as indicated above as multiple encoded shares $x_1^0, \ldots, x_1^{n-1}$ and $x_2^0, \ldots, x_2^{n-1}$. Suppose an operation g on $w_1$ and $w_2$ computes a third variable $w_3=g(w_1,w_2)$. The variable $w_3$ is represented as encoded shares $x_3^0, \ldots, x_3^{n-1}$. In an embodiment the states encoded in $x_3^0, \ldots, x_3^{n-1}$ are equal to the states encoded in $x_1^0, \ldots, x_1^{n-1}$ or in $x_2^0, \ldots, x_2^{n-1}$. In this case, if the inputs have the required relationship with the input message M, then so will the output $w_3$. In this way the required relationship may be preserved throughout the computation. The operation may be implemented as a table network for performing the operation, which in turn may be a sub-network of the table network implementing the cryptographic function.

Initial variables, e.g., those that are directly obtained from the input message, may be received by cryptographic device 200 in the correct encoded form. Alternatively, device 200 may comprise an encoding device arranged to encode the input.

The encoding of the variable w together with a state and/or as multiple shares makes it less likely that there is a collision on the encoded value during the execution of the cryptographic function. Accordingly, no collision attack is possible at this point.

In a practical embodiment, there will be no other representations of w than the representation through encoded shares. Furthermore, the protection is more effective if more of the sensitive variables are protected in this manner. Preferably, all variables that depend both on the key and on the input message are protected. To prevent collision attacks it is not required that the input messages is represented as encoded shares before an operation with the key is performed. However, ensuring that the injective mapping exists and is maintained is simplified by having the input message encoded as multiple sets of encoded shares even before the key is used.

Figure 4A:
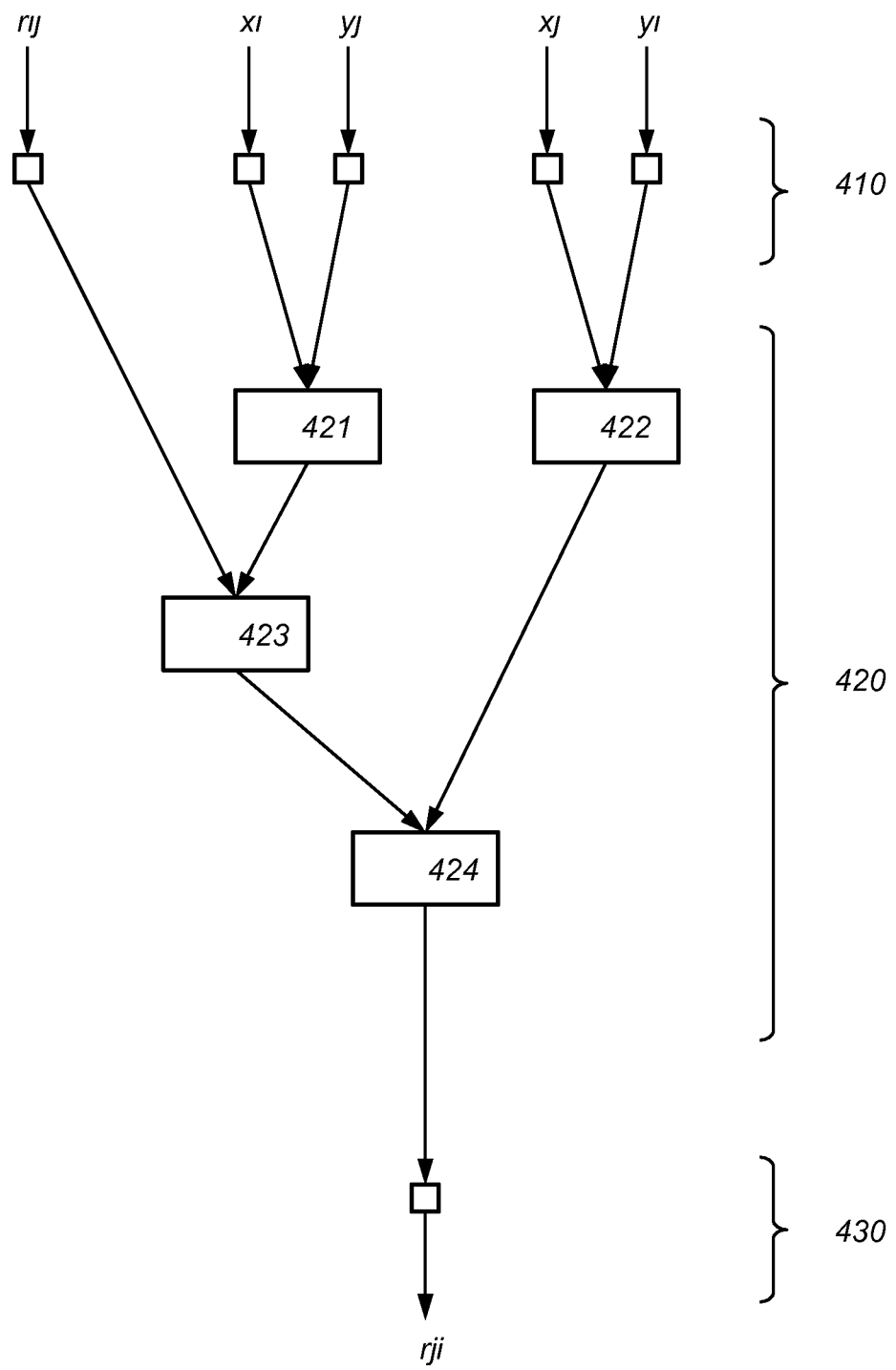

Table networks are known from white-box cryptography per se. See for example, "White-box cryptography and an AES implementation", by Chow et al. An example of a table network 420 is shown in FIG. 4a, in this case a table network for computing cross-products.

A table network receives one or more inputs, e.g., inputs 410, and produces one or more outputs, e.g., outputs 430. In table network 420 multiple look-up tables are shown; shown are tables 421-424. Tables take inputs directly from inputs 410 and/or the outputs of other tables. A table may take a single input, two inputs, or more than two inputs.

A convenient way to convert a computation on un-encoded variables w to a computation on variables w encoded as multiple shares is provided in "Higher-Order Masking Schemes for S-boxes", by Carlet et al. The paper does not discuss collision attacks or encoding with states. The paper is further referred to as Carlet. Carlet does not prevent a collision on a variable encoded as multiple shares.

Below it is explained how a calculation on a variable w, for instance to calculate the function value D(w) may be transformed to a calculation on variable w encoded in multiple shares. The function D may be the data function, but the same method may be used for any internal step of the computation of the cryptographic function, e.g., an addition, a multiplication, etc. We will show how to construct a table network that computes D(w) on shares. First we will consider here the case in which D has a single input w. Multiple states can be handled analogously. We will also first ignore states, later we will show how states can be added.

If w is represented by n shares $w_0, \ldots, w_{n-1}$, then we want to represent D(w) by n shares as well, in order to give the resulting variable the same protection as w. This is possible, for any function by making use of the following facts.

For the exposition, we first assume that the value D(w), like w, is also a k-bit number. The k-bit numbers can be considered to be elements of the finite Galois field $\mathcal{F}_{2^k}$, and the function D as a function on $\mathcal{F}_{2^k}$. All functions in finite fields are polynomials, thus, for any function D on $\mathcal{F}_{2^k}$, there exist coefficients $c_0, \ldots, c_{2^k-1}$ such that for any w $$D(w) = \Sigma_{r=0}^{2^k-1} c_r w^r$$

Also the data function S(x) may be represented as a multivariate polynomial:

$$S(x) = \sum_{v=0}^{2^{n-m}} Q_v(x_{i_1} \ldots x_{i_{n-m}}) P_v(x_{p_1} \ldots x_{p_m}),$$

where $\{P_v\}_v$ denotes the set of polynomials representing evaluation functions $S_v$ over $F_{2^m}$ and $\{Q_v\}_v$ the selection polynomials, i.e., set of polynomials representing the delta's $\{\delta_i\}_i$ over $F_{2^{n-m}}$.

The polynomial D, and the polynomials $Q_v$ and $P_v$, likewise, may be expressed as a computation on shares as follows. Let the shares be given by $X=(x_0, \ldots, x_{n-1})$ and $Y=(y_0, \ldots, y_{n-1})$. For simplicity we will assumes that the sum of the shares equals the unencoded variables. The sum of X and Y can be encoded with shares $x_i+y_i$. The scalar multiple αX may be encoded with shares $αx_i$. Finally, let Z be the product of X and Y. Define for $0 \le i < j \le n-1$, the values $r_{i,j}$ and $r_{j,i}$.

Take for $r_{i,j}$ a random element of $\mathcal{F}_{2^k}$, e.g., by choosing a random k-bit string. In an embodiment, the random number for $r_{i,j}$ is obtained by selecting at compile time a randomization function $R_{i,j}$ from the input message M to $\mathcal{F}_{2^k}$, and setting $r_{i,j}=R_{i,j}(M)$. The latter has the advantage that reliance on a random number generator is avoided at execution time. Only when the table network is constructed, referred to as compile time, is a source of randomness needed. It is noted that Carlet relies on randomness during execution time. This opens Carlet up to manipulation of the random number source during execution. In particular, the random number generator may be intercepted and replaced with constant values.

Take for $r_{j,i}=(x_iy_j+r_{i,j})+x_jy_i$; the order of computations herein is important, and indicated by brackets. Now for $0 \le i \le n-1$ take $$z_i = x_iy_i + \sum_{\substack{j=0 \\ j \ne i}}^{n-1} r_{i,j}.$$

A cross-product table sub-network may compute $r_{i,j}$. These tables compute the two cross products $x_iy_j$ and $x_jy_i$.

In an embodiment, a randomization function $R_{i,j}$ for computing $r_{i,j}$ is implemented as a table network taking the input messages as input. This avoids the need for a random number source during execution.

The shares $z_i$ now represent the product of X and Y. Using the addition, scalar multiplication and multiplication operations the polynomial representation for S may be expressed as operation on the shares. The operation on the shares in turn may be implemented as a look-up table, taking as input one or more shares and or random numbers.

A possible table network 420 to compute $r_{j,i}$ is illustrated in FIG. 4*a*. Tables 421-424 cooperate to compute $r_{j,i}$. The inputs to table network 420 are shown are reference 410. The output of table network 420 is shown at reference 430.

For example, tables 421 and 422 may be arranged to multiply their inputs, whereas tables 423 and 424 may be arranged to add their inputs. Note that each of the tables may use different encodings.

Figure 4B:
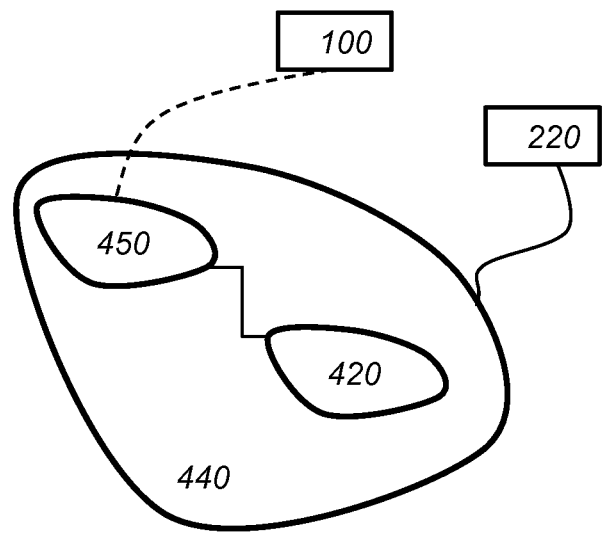

FIG. 4*b* schematically shows an example of an embodiment of a multiplication table network 440. Multiplication table network 440 may be constructed using the formulas given above to compute $Z=(z_0, \ldots, z_{n-1})$. Multiplication table network 440 is arranged to multiplying a variable X represented in computation device 200, say in a data store thereof, as a first multiple of encoded shares ($x^j$), and a second variable Y represented as a second multiple of encoded shares ($y^j$). The multiplication table network acts on the first and second multiple of encoded shares ($x^j, y^j$) and obtains a third multiple of encoded shares ($z^j$) representing the product of the first and second variable. Note that here, the superscript indices refer to shares not power. Multiplication table network 440 may be part of the table network for computing the cryptographic function.

Multiplication table network 440 may comprise cross-product table sub-networks to compute cross products, $x_iy_j$. In an embodiment cross products are computed in pairs $x_iy_j+x_jy_i$. For example, multiplication table network 440 may comprise table network 420. Multiplication table network 440 may also comprise a table network 450 to compute one or more randomization functions $R_{i,j}$. In FIG. 4*b*, table network 450 depends on input message 110. This dependence has been indicated with a dashed line to indicate that the dependence may be obtained through an intermediate, e.g., variables stored in a data store. Table network 440 may obtain its inputs and store its outputs in a data store of computation device 200.

A table acting on shares may be transformed to a table acting on encoded shares. Define s and t such that for an encoded share x we have Enc(t(x),s(x))=x. The functions s and t obtain the state and share from x respectively. Let a table T for t(x) be defined. Then Enc'(T(t(x)), P(S(x))) defines a table for x that implements the table T for the share part of x and a function P for the state part. The function P is redundant and may be chosen when creating the table network, e.g., at compile time. For example, P may be the identity function. Similar constructions are possible for multiple inputs. The encoding Enc used here is also called the input encoding. The encoding Enc' is called the output encoding. The input and output encodings of a table need not be the same, as long as the output encoding used for the output of a table is the same as the input encoding of a next table which uses said output as an input.

Figure 2E:
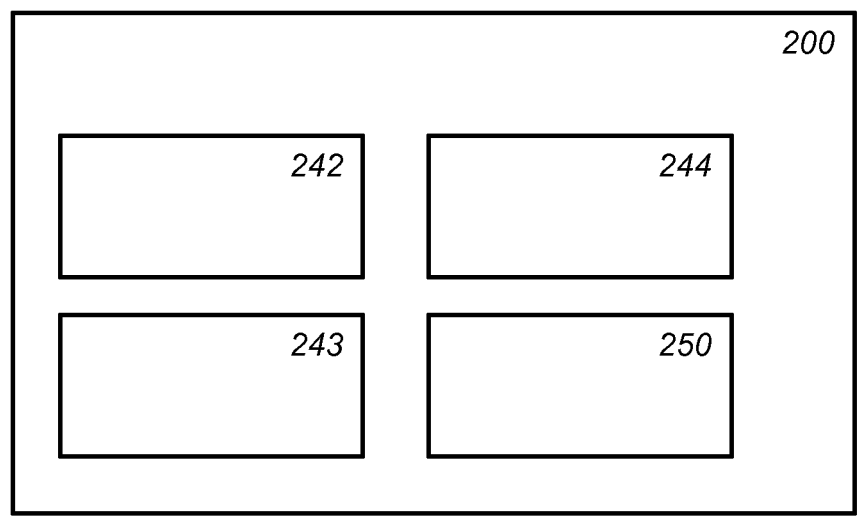

FIG. 2*e* shows an embodiment of computation device 200, e.g., as described in relation to FIG. 2*a* comprising a data store 242 and a table store 244. Data store 242 is arranged to store variables on which computation device 200 acts. In particular, data store 242 may store encoded variables, such multiple encoded shares. Table store 242 is arranged to store one or more table networks to implement selection mechanism 220 and evaluation mechanism 230. The data store 242 and table store 244 may be an electronic memory. They may be two parts of the same memory. The table store 244 may be non-volatile storage. The data store 242 may be volatile storage.

Computation device 200 may comprises a control unit 243 configured to apply the data function, e.g., as part of a block cipher to say an input message by applying the multiple look-up tables of table store 244 to the variables represented in data store 242. For example, the table store 244 may further comprise instructions that indicate the order in which the tables are to be applied to which variables.

Computation device 200 may comprise a network interface 250. Network interface 250 may be arranged to receive encoded data over a computer network. For example computation device 200 may receive encrypted data, e.g., encrypted content, which is decrypted by cryptographic device 200. The input received over network interface 250 may be represented as encoded shares, e.g., as described above. This is not necessary as the encoding may be done inside of device 200.

Typically, the device 200 comprises a microprocessor (not separately shown) which executes appropriate software stored at the device 200; for example, that software may have been downloaded and/or stored in a corresponding memory, e.g., a volatile memory such as RAM or a non-volatile memory such as Flash (not separately shown). Alternatively, the devices 200 may, in whole or in part, be implemented in programmable logic, e.g., as field-programmable gate array (FPGA). Devices 200 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 200 comprises a selection circuit, an evaluation circuit and a combination circuit. The device 200 may comprise additional circuits, e.g., a selection circuit for groups of selection variables, etc. The circuits implement the corresponding units and mechanisms described herein. The circuits may be a processor circuit and storage circuit, the processor circuit executing instructions represented electronically in the storage circuits. The circuits may also be, FPGA, ASIC or the like.

Below the effects on the code size for DES S boxes following the above partition into selection and evaluation bits is discussed. Comparison is made to the method disclosed in "Higher-Order Masking Schemes for S-Boxes" by Goubin, et al.; further referred to Goubin and to the method disclosed in "Fast evaluation of polynomials over binary finite fields and application to side-channel countermeasures" by Coron, et al.; further referred to as Coron.

In Table 1 we list the three methods, being the straightforward Cyclotomic Method from Goubin over $F_{2^6}$, and the CRV method from Coron over $F_{2^6}$ and a solution according to an embodiment over $F_{2^4}$, using 2 selection bits. Here k denotes the number of shares used to represent a variable.

TABLE 1

Counting table lookups in the three methods.

| | Multiplications | Additions | Total Table Lookups |
|---|---|---|---|
| Goubin | 11 | 62 | $11k^2 + 11k(k - 1) + 62k$ |
| Coron | 4 | 92 | $4k^2 + 4k(k - 1) + 92k$ |
| Embodiment | 8 | 75 | $8k^2 + 8k(k - 1) + 75k$ |

In Table 2 the number of bytes used for the three methods is counted when applied to DES, where k=16 and each n-bit share is accompanied by a 4-bit state, meaning that each variable over $F_{2^n}$ is represented by 16 shares of bit size n+4. It follows that the size of the tables for addition and multiplication have $2^{2(n+4)}$ entries of (n+4) bits. We give result both for a DES implementation in which different tables based on different encodings for each table lookup are used, and one in which in which tables and encodings are reused. Herein, we have n=6 for approach of Goubin and Coron, but n=4 according to an embodiment which splits up the 6-bits input into two selection bits and four evaluation bits.

TABLE 2

Counting the number of bytes required to store the tables used in a white box implementation on shares when k = 16.

| | Total Table lookups | Size per Table | Total size, with reused encodings | Total size with different encodings per lookup |
|---|---|---|---|---|
| Goubin | $22k^2 + 51k$ | $10 * 2^{20}$ bits | 2.5 MB | 7.8 GB |
| Coron | $8k^2 + 88k$ | $10 * 2^{20}$ bits | 2.5 MB | 4.2 GB |
| Embodiment | $16k^2 + 67k$ | $8 * 2^{16}$ bits | 128 kB | 323 MB |

Note that a solution according to an embodiment requires less than 10% of memory compared to the other solutions. The results of the bottom row follow from the discussion given above; below it is detailed how the general theory can be applied to DES.

The Data Encryption Standard has 8 S-boxes ($S_1, \ldots, S_8$) mapping 6-bit inputs to 4-bit outputs. Below we show how to create an arithmetic circuit over $F_{2^4}$ for evaluating each DES S-box. This arithmetic circuit can then be evaluated by share arithmetic as explained above. Note that v has size 6−4=2 bits. So it can be represented by a single element in $F_{2^4}$, denoted as [v]. The number of different values over $F_{2^4}$ of [v] is $2^2$=4. After padding these are

[0]=(0,0,0,0)
[1]=(0,0,0,1)
[2]=(0,0,1,0)
[3]=(0,0,1,1)

The 4 selection polynomials $Q_i$ over $F_{2^4}$ may be computed as follows. Compute $Q_0, Q_1, Q_2, Q_3$ over $F_4$ by $Q_0$=LagrangeInterpolate({[0],[1]}, {[1],[0]}, {[2],[0]}, {[3],[0]})

$Q_1$=LagrangeInterpolate({[0], [0]}, {[1], [1]}, {[2], [0]}, {[3], [0]})

$Q_2$=LagrangeInterpolate ({[0] [0]}, {[1], [0]}, {[2], [1]}, {[3], [0]})

$Q_3$=LagrangeInterpolate({[0],[0]}, {[1],[0]}, {[2],[0]}, {[3],[1]})

Then for each S-Box $S_i$ we choose the first and last input bits as the selection variables to define v, i.e., on input $x=x_0, \ldots x_5$ we define $v=x_0, x_5$. Then, we compute the evaluation polynomials $P_0^i, P_1^i, P_2^i, P_3^i$ as follows:

for $v \in \{0,1,2,3\}$ do $Z=\emptyset$ for $x \in F_{2^4}$ do $Z = Z \cup \{x, (S_i)_v(x)\}$ end for $P_v^i = \text{LagrangeInterpolate}(P)$ end for return $P_0^i, P_1^i, P_2^i, P_3^i$ Finally, to securely compute $S_i(x)$ the equation $$s = Q_0(l)P_0^i(r) + Q_1(l)P_1^i(r) + Q_2(l)P_2^i(r) + Q_3(l)P_3^i(r),$$

is evaluated, where each polynomial is evaluated on the shares. Here $l = \{l_1, \ldots, l_k\}$ represents $x_0, x_5$ and $r = \{r_1, \ldots, r_k\}$ represents $x_1, x_2, x_3, x_4$ and $s = \{s_1, \ldots, s_k\}$ represents the result $S_i(x)$.

This solution requires 4 multiplications over $F_{2^4}$ to compute all powers of $r$ required by $P_0^i, P_1^i, P_0^i, P_1^i$ using the Cyclotomic Method and 1 multiplication to compute powers of $l$ required to evaluate the degree-3 polynomials $Q_0, Q_1, Q_2, Q_3$. Then, 4 multiplications are required to compute the products $Q_0(l)P_0^i(r), Q_1(l)P_1^i(r), Q_2(l)P_2^i(r), Q_3(l)P_3^i(r)$. In conclusion, this solution requires 9 multiplications over $F_{2^4}$. The polynomials $P_j^i$ require 15 additions each and the polynomials $Q_j$ require 3 additions each. So our solution requires $4*15+4*3+3=75$ additions.

Figure 5A:
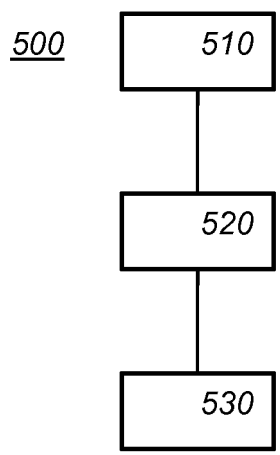
Figure 5B:
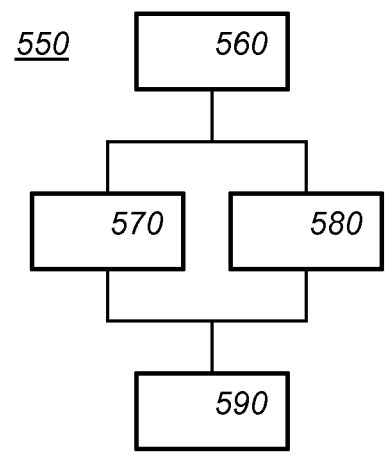

FIG. 5a schematically shows a flow chart for a computation method 500. Computation method 500 is arranged to evaluate a data function (S) mapping a number (n) of input variables to a number of output variables (m), the data function being arranged in the computation method as a computation comprising selection functions and evaluation functions, the input variables being partitioned into one or more selection variables and one or more evaluation variables, for each particular combination of values of the selection variables (v) a corresponding selection function ($Q_v$) and evaluation function ($P_v$) are defined. The computation method 500 comprises A selection part 510 comprising receiving the one or more selection variables, and evaluating the selection functions for the received selection variables, a selection function receiving as input the selection variables and the output of the selection function indicating whether the selection variables received in the selection function equal the particular combination of values corresponding to the selection function, An evaluation part 520 comprising receive the one or more evaluation variables, and evaluating the evaluation functions for the received evaluation variables, an evaluation function receiving as input the evaluation variables and the output of the evaluation function representing the output of the data function having as input the union of the evaluation variables and the particular combination of values of the selection variables corresponding to the evaluation function, and A combination part 530 arranged to combine the outputs of the selection mechanism and the evaluation mechanism into the output of the data function for the input variables.

A further embodiment of a computation method 550 comprises receiving 560 input variables, preferably encoded as multiple encoded shares evaluating 570 the selection polynomials for each combination of values of the selection variables, with as input the actual received selection variables of the received input variables, evaluating 580 the evaluation polynomials for each combination of values of the selection variables, with as input the actual received evaluation variables of the received input variables, computing 590 the combination of the selection and evaluation polynomials, e.g., by multiplying the results of selection polynomials with the result of the corresponding evaluation polynomials and adding the results of the multiplications.

The evaluations 570 and 580 and the computing 590 may be performed by a table network operating on encoded variables.

Many different ways of executing the methods 500 and 550 are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 570 and 580 may be executed, at least partially, in parallel. Moreover, a given step may not have finished completely before a next step is started.

A method according to the invention may be executed using software, which comprises instructions for causing a processor system to perform method 500 and/or 550. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
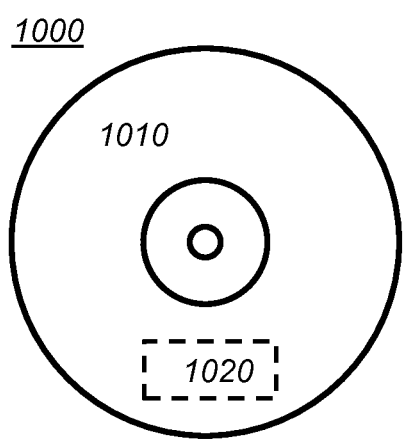

FIG. 7a shows a computer readable medium 1000 having a writable part 1010 comprising a computer program 1020, the computer program 1020 comprising instructions for causing a processor system to perform a method of computation, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of computation.

Figure 7B:
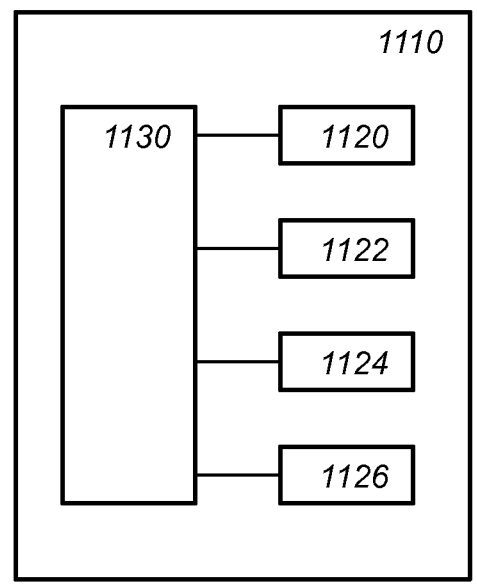

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A computation device arranged to evaluate a data function (S) that maps a number (n) of input variables to a number (m) of output variables wherein the input variables are partitioned into one or more selection variables and one or more evaluation variables, wherein for each combination of values of the selection variables ($v$), a corresponding selection function ($Q_v$) and evaluation function ($P_v$) are defined, the computation device comprising:
a selection circuit arranged to:
receive the one or more selection variables, and
evaluate the selection functions for the received selection variables,
wherein each selection function receives as input the selection variables and
wherein an output of each selection function indicates whether the combination of values of the selection variables received by the selection function is equal to the combination of values corresponding to the selection function;
an evaluation circuit arranged to:
receive the one or more evaluation variables, and
evaluate the evaluation functions for the received evaluation variables,
wherein each evaluation function receives as input the evaluation variables, and
wherein an output of each evaluation function represents an output of the data function, wherein the data function has as input the union of the evaluation variables and the combination of values of the selection variables corresponding to the evaluation function; and
a combination circuit arranged to:
combine the outputs of the selection circuit and the evaluation circuit into an output of the data function for the input variables, and
provide the output of the data function,
wherein the combination circuit provides a sum of products ($\Sigma_v Q_v P_v$) of the selection function ($Q_v$) and the evaluation function ($P_v$) over all combinations of values of the selection variables ($v$).

2. The computation device of claim 1,
wherein at least one of: the selection circuit comprises multiple sub-selection circuits, or the evaluation circuit comprises multiple sub-evaluation circuits.

3. The computation device of claim 1,
wherein the selection variables are further partitioned into multiple groups of selection variables,
wherein a selection function is arranged in the computation device as a product of multiple sub-selection functions,
wherein each of the multiple sub-selection functions corresponds to a group of the multiple groups of selection variables,
wherein a sub-selection function receives as input the selection variables in the group and
wherein the output of the sub-selection function indicates if the received selection variables is equal to the particular combination of values in the group corresponding to the selection function.

4. The computation device of claim 1, wherein the input variables and/or output variables are bits.

5. The computation device of claim 1 arranged as a block cipher, wherein the data function is an s-box of the block cipher.

6. The computation device of claim 5, wherein the block cipher is the DES or triple DES block cipher, and wherein the s-box is one of the DES s-boxes.

7. The computation device of claim 1,
wherein the number of input variables (n) is larger than the number of output variables (m), and
wherein the number of evaluation variables is equal to the number of output variables.

8. The computation device of claim 1, wherein one or more of the input variables are encoded.

9. The computation device of claim 8,
wherein the encoded input variable ($x_i$) is encoded as a plurality of shares ($w_i$), and
wherein the plurality of shares ($w_i$) are encoded together with a plurality of states ($s_i$).

10. The computation device of claim 1, wherein at least one selection function is implemented as a selection polynomial and/or at least one evaluation function is implemented as an evaluation polynomial.

11. The computation device of claim 1, wherein the selection functions are used for multiple data functions.

12. The computation device of claim 1, wherein at least one of the selection circuit, evaluation circuit, and/or the combination circuit is implemented as a table network.

13. A computation method for evaluating a data function (S) mapping a number (n) of input variables to a number (m) of output variables wherein the input variables are partitioned into one or more selection variables and one or more evaluation variables, wherein for each combination of values of the selection variables ($\upsilon$), a corresponding selection function ($Q_\upsilon$) and evaluation function ($P_\upsilon$) are defined, the computation method comprising:
   receiving the one or more selection variables,
   evaluating the selection functions for the received selection variables,
      wherein each selection function receives as input the selection variables and
      wherein the output of each selection function indicates whether the combination of values of the selection variables received in the selection function equals the combination of values corresponding to the selection function;
   receiving the one or more evaluation variables and
   evaluating the evaluation functions for the received evaluation variables,
      wherein each evaluation function receives as input the evaluation variables and
      wherein the output of each evaluation function represents an output of the data function, wherein the data function has as input a union of the evaluation variables and the combination of values of the selection variables corresponding to the evaluation function;
   combining the outputs of the selection function and the evaluation function into an output of the data function for the input variables,
      wherein the combining includes providing a sum of products ($\Sigma_\upsilon Q_\upsilon P_\upsilon$) of the selection function ($Q_\upsilon$) and the evaluation function ($P_\upsilon$) over all combinations of values of the selection variables ($\upsilon$); and
   providing the output of the data function.

14. A non-transitory computer readable medium comprising a program for evaluating a data function (S) mapping a number (n) of input variables to a number (m) of output variables, wherein the input variables are partitioned into one or more selection variables and one or more evaluation variables, wherein for each combination of values of the selection variables ($\upsilon$), a corresponding selection function ($Q_\upsilon$) and evaluation function ($P_\upsilon$) are defined; the program, when executed by a processor, causes the processor to:
   receive the one or more selection variables;
   evaluate the selection functions for the received selection variables,
      wherein each selection function receives as input the selection variables and
      wherein the output of each selection function indicates whether the combination of values of the selection variables received in the selection function equals the combination of values corresponding to the selection function;
   receive the one or more evaluation variables; and
   evaluate the evaluation functions for the received evaluation variables,
      wherein each evaluation function receives as input the evaluation variables, and
      wherein the output of each evaluation function represents an output of the data function, wherein the data function has as input a union of the evaluation variables and the combination of values of the selection variables corresponding to the evaluation function; and
   combine the outputs of the selection function and the evaluation function into an output of the data function for the input variables,
      wherein the combining includes providing a sum of products ($\Sigma_\upsilon Q_\upsilon P_\upsilon$) of the selection function ($Q_\upsilon$) and the evaluation function ($P_\upsilon$) over all combinations of values of the selection variables ($\upsilon$); and
   provide the output of the data function.

15. The medium of claim 14, wherein the input variables and/or output variables are bits.

16. The medium of claim 14, wherein the data function is an s-box of a block cipher.

17. The medium of claim 14, wherein the number of input variables (n) is larger than the number of output variables (m), and wherein the number of evaluation variables is equal to the number of output variables.

18. The medium of claim 14, wherein one or more of the input variables are encoded.

19. The medium of claim 18, wherein the encoded input variable ($x_i$) is encoded as a plurality of shares ($w_i$), and wherein the plurality of shares ($w_i$) are encoded together with a plurality of states ($s_i$).

20. The medium of claim 14, wherein at least one selection function is implemented as a selection polynomial and/or at least one evaluation function is implemented as an evaluation polynomial.

* * * * *